United States Patent Office 2,979,446
Patented Apr. 11, 1961

2,979,446

POLYMERIZATION PROCESS

Herbert R. Anderson, Jr., Bartlesville, Okla., assignor to Phillips Petroleum Company, a corporation of Delaware No Drawing. Filed Mar. 17, 1958, Ser. No. 721,647

14 Claims. (Cl. 204—154)

This invention relates to the polymerization of unsaturated organic compounds by subjecting the compounds to high energy radiation.

It is well known that various types of unsaturated organic compounds can be polymerized to produce valuable resins and liquids. Many of these polymerizations are believed to be promoted by the action of free radicals which are usually produced by a catalyst in the system. It is also known that various types of polymerization reactions can be promoted by subjecting the material to be polymerized to the action of high energy, ionizing radiation. In accordance with the present invention, it has been discovered that polymerization systems of the latter type can be carried out much more efficiently by the addition of a promoter to the system. This promoter is a metal salt of a saturated or unsaturated aliphatic acid containing at least 8 carbon atoms per molecule. The polymerization is carried out by subjecting the material to be polymerized to high energy, ionizing radiation, such as alpha particles, beta particles, gamma rays, X-rays or fast neutrons. Any monomer or monomers which will polymerize by a free radical mechanism in bulk polymerization systems can be polymerized in accordance with the process of this invention.

Accordingly, it is an object of this invention to provide an improved process for polymerizing unsaturated organic compounds.

Another object is to provide a process for increasing the efficiency of radiation induced polymerizations by incorporating a promoter in the system which comprises metal salt of a saturated or unsaturated aliphatic acid containing at least 8 carbon atoms per molecule.

Other objects, advantages and features should become apparent from the following detailed description of present preferred embodiments of the invention.

The materials which can be polymerized in accordance with this invention are those monomers which will polymerize by a free radical mechanism in bulk polymerization systems. The monomers which can be polymerized are those which contain vinyl groups, including conjugated dienes. Among the materials which can be polymerized are vinylpyridines such as 2-vinylpyridine, 2-methyl-5-vinylpyridine, 5-methyl-2-vinylpyridine, 5-ethyl-2-vinylpyridine, 4-methyl-3-vinylpyridine, and 2-octyl-5-vinylpyridine; esters of acrylic and methacrylic acids such as methyl acrylate, methyl methacrylate, ethyl acrylate, ethyl methacrylate, and the like; acrylonitrile; methacrylonitrile; methyl vinyl ketone; styrene and alkyl-substituted derivatives; vinyl chloride; vinyl acetate; vinylidene chloride; conjugated dienes such as 1,3-butadiene, isoprene, piperylene, 2,3-dimethyl-1,3-butadiene, and 2-methyl-1,3-pentadiene; and monoolefins such as ethylene, propylene, 1-butene, and isobutylene. The process of this invention is generally applicable to the production of both homopolymers and copolymers of monomers which are capable of being polymerized by a free radical mechanism in bulk polymerization. Graft polymers can also be obtained when operating in accordance with the method of this invention. Examples of graft polymers include methyl methacrylate on polybutadiene, styrene on polybutadiene, styrene on polyisoprene, and ethyl methacrylate on polyisoprene.

The metal salt promoters employed in accordance with this invention are formed from both saturated and unsaturated straight and branched chain aliphatic acids containing at least 8 carbon atoms per molecule. For the best results, the salt employed should contain more than 12 carbon atoms per molecule. As a practical matter, the salts generally do not contain more than about 30 carbon atoms per molecule. Various substituted derivatives of these acids can also be employed. Such substituents include alkyl, cycloalkyl, aryl (preferably phenyl), alkaryl, aralkyl, hydroxy, alkoxy, aryloxy, halogen, amino, and the like, groups. Suitable acids for use in forming the metal salts include: caprylic, capric, lauric, tridecanoic, myristic, palmitic, stearic, arachidic, behenic, lignoceric, cerotic, heptacosanoic, octacosanoic, triacontanoic, 3-methylcapyrylic, 2,3-diethylcapric, 2,4-dimethyltridecanoic, 4,5-dimethyl-6-ethylmyristic, 2-methyl-3-ethylstearic, 5-phenylstearic, 2-methyl-6-benzylpalmitic, 7-cyclohexylmyristic, 5-benzyllauric, 4-tolyltridecanoic, 3-octenoic, 2-monenoic, 9-decenoic, 5-dodecenoic, 7-tridecenoic, 6-pentadecenoic, 9-octadecenoic, (oleic), 11-octadecenoic (vaccenic), 9-12-octadecadienoic (linoleic), 9,12,15-octadecatrienoic (linolenic), ricinoleic, gadoleic, cetoleic, 2-methyl-3-ethyl-9-decenoic, 4,5-diethyl-3-dodecenoic, 10-phenyldodecenoic, 3-cyclohexyltridecenoic, 3-octynoic, 5-decynoic, 6-dodecynoic, 6-tridecynoic, 8-octadecynoic, 5-n-propyl-3-octynoic, 3-tolyl-6-decynoic, suberic, azelaic, sebacic, hendecanedioic, dodecanedioic, 3,5-di-n-propylsuberic, 4-phenylazelaic, 5-ethylsebacic, 3-methyl-6-benzylhendecanedioic, 6-tolyltridecanedioic, 2-octenedioic, 4-decenedioic, 5-hendecenedioic, 7-tetradecenedioic, 3-heptadecenedioic, 4-pentyl-2-decenedioic, 2,5-dodecadienedioic, 3,6-tetradecadienedioic, 3,6-di-tert-butyl-2-octenedioic, 7-phenylhendecenedioic, 2-octynedioic, 5-decynedioic, 4-dodecynedioic, 6-tridecynedioic, 4-phenyl-2-octynedioic and 5,6-diethyl-4-dodecynedioic acids.

Any metal can be employed to form the promoter salt. In general, salts prepared from metals of relatively high atomic numbers are the better promoters. However, salts of metals such as calcium and zinc have been found to be excellent promoters.

The amount of the metal salt promoter employed is generally in the range of about 0.01 to 0.1 mol per 100 grams of monomeric material.

The method of this invention comprises charging the material or materials to be polymerized, together with the metal salt promoter, to a suitable reaction vessel. In many applications, it is desirable to exclude oxygen from the vessel because oxygen influences the rate of such polymerization reactions. This can be accomplished by evacuating the vessel or by purging it with an inert material, such as nitrogen. Diluents, such as pentane, hexane, heptane, cyclohexane, methylcyclohexane, benzene, toluene, xylene and the like, can be employed, if desired. The process of this invention can also be conducted in an aqueous emulsion or suspension. In general, the type of material or materials employed in conjunction with the monomers can be the same as the materials employed heretofore for conventional polymerization reactions.

The irradiation can advantageously be conducted by placing the materials to be reacted adjacent a spent fuel element or group of fuel elements after their withdrawal from a nuclear reactor. This irradiation can conveniently be carried out while the elements are "cooling off" in a canal adjacent the reactor. This canal is filled with deionized water. The fuel elements can be any suitable type which are capable of producing radiation within the intensity range hereinafter specified. In the specific example described hereinafter, the fuel elements employed were removed from the Materials Testing Reactor, which is described in Nucleonics, vol. 12, No. 4, pages 21–26, April 1954. The active portion of these fuel elements comprises uranium alloy plates which are enriched in uranium-235 and covered by thin sheets of aluminum.

The materials to be irradiated are placed sufficiently close to the fuel elements or other source of radiation to obtain a nominal dose rate of $10^3$ to $10^7$ Roentgen equivalent physical (rep.) units per hour, with a total dosage of $10^5$ to $10^{11}$ reps. One rep. corresponds to an absorption of 93 ergs per gram of material in the polymerization mixture. The term "nominal dosages" is employed herein to refer to the actual dosages received by the control (no promoter) in the same radiation field. The radiation produced by the spent fuel elements previously described is predominantly gamma rays. However, other types of high energy, ionizing radiation, such as alpha particles, beta particles, X-rays, or fast neutrons (energies of 1 mev. or higher) can be employed as long as the specified radiation intensities and nominal dosages are utilized. When alpha and beta particles are employed, it is generally necessary to employ internal sources because of the low penetrating power of these particles. It is necessary to employ fast neutrons rather than slow neutrons in order to prevent radioactive contamination. The time of radiation can vary considerably, provided the specified total nominal dosage radiation intensity is maintained. The degree of polymerization generally is increased as the radiation dosage increases.

The radiation dosage required for attaining high conversion differs with different types of monomers, but is generally within the range specified. The radiation required to provide a given degree of polymerization in accordance with this invention is substantially less than the radiation required to provide a corresponding degree of polymerization in the absence of the metal salt promoter. It is believed that the metal present in the promoter absorbs a considerably greater quantity of energy than the polymerization system alone. This increased absorption of energy is believed to result in the liberation of a greater number of free radicals which in turn promote the polymerization reaction. It is thought that perhaps the acid radicals may be split to provide additional reaction promoting free radicals.

The temperature at which the radiation is conducted can vary through a wide range of from approximately $-100°$ F. upwardly. However, the temperature must not be so high as to cause thermal decomposition of any of the material present. The polymers produced range from liquids to solids, depending upon the type of monomers, the radiation dosage, and the temperature at which the radiation is performed.

The following runs are illustrative of this invention.

Methyl methacrylate was purified by vacuum distillation and charges of 80 grams each were placed in glass beverage bottles of approximately 7 ounce capacity which contained promoters of this invention. The quantities of metal salts were selected so that there were the same number of gram atoms of metal in each bottle. Purified nitrogen was employed to purge the bottles which were then capped. Duplicate pairs of bottles were prepared in order to determine the extent of polymerization, if any, in the absence of radiation. One set of the bottles was placed in aluminum cans which were flushed with helium, pressurized with 20 pounds per square inch of helium, and irradiated by spent fuel elements in the canal of the Materials Testing Reactor at Arco, Idaho, at a canal temperature of approximately 75° F. During irradiation, the bottles were shaken occasionally to keep the promoters suspended in the methyl methacrylate. Each of the irradiated samples received a total nominal dosage of $1 \times 10^6$ reps. Immediately after irradiation both the irradiated samples and the controls were short-stopped with hydroquinone, and methyl alcohol was added to precipitate the polymer. Any metal salt promoter which was extracted by the precipitant was recovered by evaporation to permit the amount which remained in the polymer to be calculated. The produced polymers were dried in a vacuum oven at 50° C. Results of the runs were as follows:

| Promoter | Atomic No. of Metal Atom | Promoter used phm.[1] | Wt. Percent Metal in Promoter | Gram Atoms of Metal per 100 g. Monomer | Wt. of Polymer, g.[2] | Conversion, Percent |
|---|---|---|---|---|---|---|
| Lithium stearate | 3 | 5 5 | 2.4 | 0.0189 | 12.2 | 15.3 |
| | | | | | 15.7 | 19.6 |
| Magnesium stearate | 12 | 11.5 | [3] 4.0 | 0.0189 | 18.1 | 22.7 |
| Aluminum octoate | 13 | 6.1 | [3] 8.3 | 0.0188 | 12.7 | 15.9 |
| Calcium stearate | 20 | 11.4 | [3] 6.6 | 0.0188 | [4] 49.7 | 62.2 |
| Zinc stearate | 30 | 11.9 | [3] 10.3 | 0.0187 | 66.9 | 83.6 |
| Barium stearate | 56 | 13.3 | [3] 19.5 | 0.0189 | 55.6 | 69.6 |

[1] Parts per 100 parts monomer (grams per 100 grams monomer).
[2] It was assumed that all of the promoter not extracted by the precipitant remained physically dispersed in the polymer.
[3] Based on manufacturer's analysis.
[4] Corrected for amount of polymer produced without irradiation; all others listed above displayed no detectable polymerization without irradiation.

The foregoing examples show that monomers can be polymerized effectively by subjecting the monomers to high energy radiation in the presence of a metal salt promoter. The degree of polymerization is increased substantially by the addition of the promoter to the system.

As additional examples of the operation of this invention, samples of monomers and mixtures of monomers (and controls) are prepared in the manner previously described except that one set is prepared using silica containers. One set of samples, including controls, is subjected to X-rays, another set is positioned adjacent spent fuel elements of the Materials Testing Reactor, and a third set (silica containers) is positioned in the core of said Materials Testing Reactor so as to be subjected to neutron and gamma radiation. The samples are subjected to radiation in the amounts indicated in the following table:

| Monomers | Grams | Total Nominal Dosage, Reps. |
|---|---|---|
| Acrylonitrile | 80 | $5 \times 10^5$ |
| Styrene | 80 | $5 \times 10^6$ |
| Butadiene/styrene (70/30 wt. ratio) | 56/24 | $1 \times 10^6$ |
| Butadiene | 80 | $1 \times 10^6$ |
| Butadiene/2-methyl-5-vinylpyridine (80/20 wt. ratio) | 64/16 | $1 \times 10^6$ |
| 2-Methyl-5-vinylpyridine | 80 | $1 \times 10^7$ |
| Butadiene/acrylonitrile (90/10 wt. ratio) | 72/8 | $5 \times 10^5$ |

Each of the monomer samples listed above is prepared with each of the following promoters in the amounts indicated:

| Promoter | Atomic No. of Metal | Amount, phm.[1] | Gram Atoms of Metal per 100 g. Monomer |
|---|---|---|---|
| Lead stearate | 82 | 11.6 | 0.015 |
| Lead ricinoleate | 82 | 12.0 | 0.015 |
| Ferric palmitate | 26 | 14.6 | 0.015 |
| Ferrous stearate | 26 | 9.3 | 0.015 |
| Stannic myristate | 50 | 15.5 | 0.015 |
| Ferric caprylate | 26 | 7.5 | 0.015 |
| Stannous laurate | 50 | 7.8 | 0.015 |
| Bismuth oleate | 83 | 15.8 | 0.015 |
| Cadmium ricinoleate | 48 | 10.6 | 0.015 |

[1] Parts per 100 parts monomer (grams per 100 g. monomer).

Higher conversions of polymer are obtained in each run in the presence of the promoter than in the corresponding control without the promoter.

While the invention has been described in conjunction with present preferred embodiments, it should be evident that it is not limited thereto.

What is claimed is:

1. A process for polymerizing unsaturated organic compounds which comprises subjecting unsaturated organic monomers which are capable of being polymerized by a free radical mechanism in a bulk polymerization system to from $10^5$ to $10^{11}$ reps. of high energy, ionizing radiation in the presence of a metal salt of an aliphatic acid containing at least 8 carbon atoms per molecule, said metal salt being present in an amount of from 0.01 to 0.1 mol per 100 grams of monomers to be polymerized.

2. The process of claim 1 wherein the material is subjected to from $10^3$ to $10^7$ reps. of high energy, ionizing radiation per hour.

3. The process of claim 1 wherein said aliphatic acid contains from 12 to 30 carbon atoms per molecule.

4. The process of claim 1 wherein said metal salt comprises barium stearate.

5. The process of claim 1 wherein said metal salt comprises zinc stearate.

6. The process of claim 1 wherein said metal salt comprises calcium stearate.

7. The process of claim 1 wherein said metal salt comprises magnesium stearate.

8. The process of claim 1 wherein said metal salt comprises lithium stearate.

9. The process of claim 1 wherein said metal salt comprises aluminum octoate.

10. The process of claim 1 wherein said radiation comprises gamma rays.

11. A process for polymerizing unsaturated organic compounds which comprises subjecting unsaturated organic monomers which are capable of being polymerized by a free radical mechanism in a bulk polymerization system to from $10^5$ to $10^{11}$ reps. of high energy, ionizing radiation in the presence of a metal salt of a material selected from the group consisting of an aliphatic acid containing at least 8 carbon atoms per molecule and an alkyl-substituted derivative of such an acid, said material being present in an amount of from 0.01 to 0.1 mol per 100 grams of monomers to be polymerized.

12. A process for polymerizing methyl methacrylate which comprises subjecting same to from $10^5$ to $10^{11}$ reps. of high energy, ionizing gamma radiation in the presence of a metal salt of an aliphatic acid containing at least 8 carbon atoms per molecule, said metal salt being present in an amount of from 0.01 to 0.1 mol per 100 grams of methyl methacrylate to be polymerized.

13. The process of claim 12 wherein said metal salt is a metal stearate.

14. The process of claim 12 wherein said metal salt is a metal octoate.

References Cited in the file of this patent

UNITED STATES PATENTS

| | | |
|---|---|---|
| 2,803,598 | Black et al. | Aug. 20, 1957 |

FOREIGN PATENTS

| | | |
|---|---|---|
| 665,262 | Great Britain | Jan. 23, 1952 |
| 714,843 | Great Britain | Sept. 1, 1954 |